July 28, 1942.   W. M. SCOTT, JR   2,291,350
PROTECTIVE SYSTEM FOR FEEDER CIRCUITS
Filed July 11, 1940
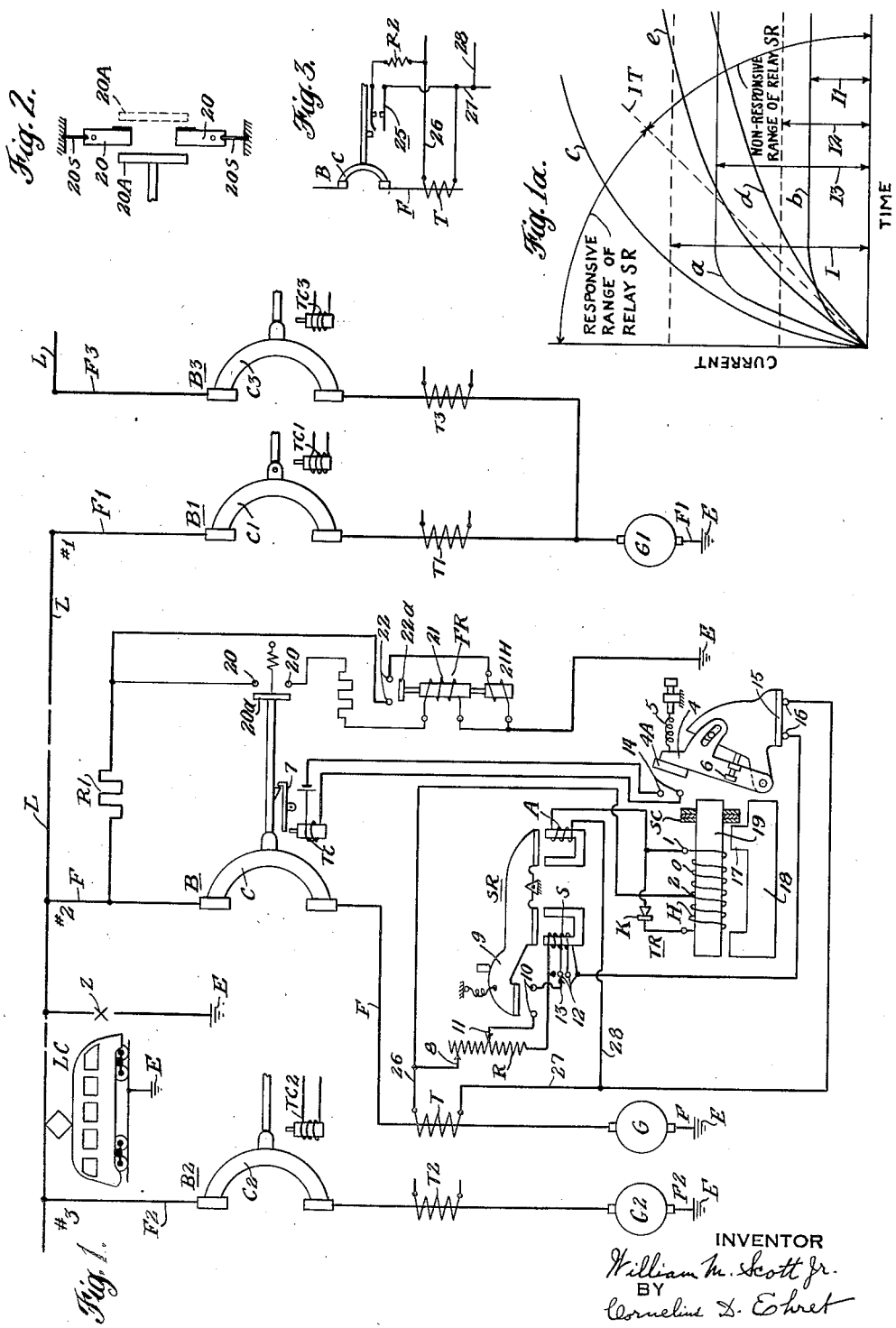
INVENTOR
William M. Scott Jr.
BY
Cornelius D. Ehret
ATTORNEY Patented July 28, 1942

2,291,350

UNITED STATES PATENT OFFICE 2,291,350

PROTECTIVE SYSTEM FOR FEEDER CIRCUITS

William M. Scott, Jr., Bryn Mawr, Pa., assignor to I-T-E Circuit Breaker Company, Philadelphia, Pa., a corporation of Pennsylvania Application July 11, 1940, Serial No. 344,851

12 Claims. (Cl. 175—294)

My invention relates to relay systems and particularly to relay systems for controlling circuit breakers in feeder circuits to third rails or trolley wires, particularly those of direct-current railway systems.

In accordance with my invention, power is fed to the trains through a circuit including a third rail or trolley wire divided into sections each fed from two or more substations spaced along the right of way, and provision is made to insure tripping of all circuit breakers in feeder circuits from the substations which, unless the circuit-breakers were tripped, otherwise would supply current to a fault common to, or in common fed by, said feeder circuits.

More particularly, when the circuit breaker of a substation trips in response to a fault occurring near it, there is established an artificial fault insuring sufficiently rapid rate of increase in the feeder current of the next substation to insure tripping of its circuit breaker which, in turn, if the substation is intermediate the ends of the section, creates an artificial fault insuring tripping of the circuit breaker of the next station and so on until all stations feeding the faulty section are out of service until the fault is corrected.

My invention further resides in the systems having the features hereinafter described and claimed.

This application is in part a continuation of my copending application Serial No. 224,236, filed August 11, 1938.

For an understanding of my invention, reference is made to the accompanying drawing in which:

Fig. 1 diagrammatically illustrates a system of power distribution;

Fig. 1a comprises curves referred to in discussion of the operating characteristics of tripping systems herein described;

Fig. 2 shows an alternative form of auxiliary control switch.

Fig. 3 diagrammatically illustrates a modification of part of the system of Fig. 1.

Referring to Fig. 1, in the system for controlling tripping of circuit breaker B in feeder cuit, or ground E, usually formed by the car rails. Preferably the magnetic circuit or core of the transformer is provided with an air gap to prevent saturation during flow of heavy currents and to enable it to respond to current surges even when heavily loaded. When there is an increase or decrease in magnitude of the current traversing the feeder there is produced by the transformer T a current whose polarity depends upon the sense of change (increase or decrease) of the feeder current, and whose magnitude is substantially proportional to the change in magnitude of the feeder current.

The secondary voltage of the transformer is impressed, through conductors 26, 27, 28, upon the terminals 1, 2 of the tripping magnet or relay TR whose tripping coil O is wound upon the core structure 18, 19 preferably provided with an air gap to prevent magnetic saturation under all conditions of operation. The armature 4 of relay TR biased as by spring 5 against adjustable stop 6, may either directly trip the breaker B, as by tripping latch 7, or equivalent, or may indirectly effect tripping of the breaker as by closure of the circuit of a tripping coil TC. In the latter case, as shown in Fig. 1, armature 4 when attracted causes contact 4A to bridge contacts 14 and so close the circuit of the tripping coil TC.

In shunt to the operating coil O of the tripping relay TR are connected in series the resistance R, preferably adjustable as by contact 8, and the winding S of a relay SR. The resistance R and coil S provide in shunt to the operating coil O a path whose reactance is materially less than that of coil O; by selection or adjustment the resistance of coil O is materially less than that of resistance R and the inductance of coil O is high compared to the inductance of coil S.

When, under conditions hereinafter discussed, the current through winding S of relay SR attains sufficiently high value, its armature 9 closes the contacts 10, 10 to shunt all or part of the resistance R, depending upon the setting of contact 11, and so reduces the impedance of the shunt path R, S for the operating coil O of relay TR. In other words, when the relay SR responds to close its contacts, an increased percentage of the total current from the series transcompleting a low impedance path between said conductors for flow of current from the source or sources connected thereto through the untripped circuit breaker or breakers.

3. A system comprising a load circuit, a plurality of feeder circuits connected thereto, a source of current in each of said feeder circuits, a circuit breaker in each of said feeder circuits, means for tripping each of said circuit-breakers responsive to current supplied by the associated current source to said load circuit, and means responsive to tripping of any one of said circuit breakers for providing an artificial fault effecting increase of current supplied to the load circuit by the sources associated with the untripped circuit-breakers so to effect tripping of at least one other of said circuit breakers by response of its tripping means to the increased current from its associated source.

4. A system comprising a load circuit section, a plurality of feeder circuits connected thereto at points intermediate and adjacent the ends thereof, a circuit breaker in each of said feeder circuits, means for tripping each of said circuit-breakers responsive to its associated feeder current, and means responsive to tripping of the circuit breaker in an intermediate feeder circuit for increasing the current in another of said feeder circuits nearer an end of said section to extent effecting response of the tripping means of its circuit breaker.

5. A system comprising a load circuit including a conductor of substantial length and having relatively high distributed inductance, a plurality of feeder circuits connected to said conductor at intervals along its length, a circuit breaker in each of said feeder circuits, means for tripping the circuit breaker in each feeder circuit in response to excessive rate of change of current in its feeder circuit but non-responsive to remote faults because of aforesaid inductance of the load-circuit conductor, and means responsive to tripping of the circuit breaker in one of said feeder circuits establishing an artificial fault causing excessive rate of change of the current in an adjacent feeder circuit.

6. A system comprising a load circuit, a plurality of feeder circuits connected thereto, a circuit breaker in each of said feeder circuits, means for tripping each of said circuit breakers in response to excessive rate of rise of feeder current, and means responsive to tripping of at least one of said circuit breakers to produce an artificial fault causing excessive rate of rise of current in a feeder circuit including another of said circuit breakers.

7. A system comprising a load circuit, a plurality of feeder circuits connected thereto, a circuit breaker in each of said feeder circuits, means for tripping each of said circuit breakers in response to excessive rate of rise of feeder current, a relay energized in response to tripping of at least one of said circuit breakers to produce an artificial fault causing tripping of another of said circuit breakers, and a hold-in circuit for maintaining said relay energized until all of said circuit breakers have tripped.

8. A system comprising a load circuit, a plurality of feeder circuits connected thereto, a circuit breaker in each of said feeder circuits, a tripping arrangement for each of said circuit breakers comprising a series transformer having a winding traversed by current through the circuit breaker, an electromagnetic device energized from said transformer to effect tripping of said circuit breaker, and electromagnetic means energized from said transformer to vary the sensitivity of said electromagnetic device as a function of the rate of change of said current, and means responsive to tripping of a circuit breaker in one of said feeder circuits to produce an artificial fault causing high rate of change of current in the series transformer winding included in another of said feeder circuits.

9. A power system comprising a plurality of feeder circuits at intervals connected to a load circuit, circuit-breakers individual to said feeder circuits for automatically disconnecting each of them from said load circuit in response to predetermined electrical conditions of the feeder circuit, and means for bringing into the system, upon tripping of one of said circuit-breakers in response to a fault commonly fed by said feeder circuits, and by recourse between said intervals to feeder and load circuit conductors only, means effective to cause tripping of one or more of the remainder of said circuit-breakers.

10. A power system comprising a plurality of feeder circuits at intervals connected to a load circuit, circuit-breakers individual to said feeder circuits for automatically disconnecting each of them from said load circuit in response to predetermined electrical conditions of the feeder circuit, and means for ensuring tripping of all circuit-breakers in feeders in common supplying power to a fault, and with recourse between said intervals to feeder and load circuit conductors only, comprising switching means, operated upon tripping of one of said circuit-breakers, and impedance means controlled thereby of magnitude to cause tripping of the remainder of said circuit-breakers.

11. In a tripping system for feeder circuit-breakers, means for ensuring tripping of a circuit-breaker in a feeder so remote from a fault that the impedance from the fault to the feeder precludes tripping directly in response to the fault comprising switching means operated by tripping of a circuit-breaker of a feeder circuit nearer and directly in response to the fault, and an artificial fault circuit completed by said switching means at such point nearer the remote feeder circuit than the said original fault that the circuit-breaker of said remote feeder circuit is tripped.

12. In a direct-current power circuit comprising a load-circuit conductor of substantial distributed inductance and including feeder circuits connected at different points along said conductor, a circuit-breaker in each of said feeder circuits, means for tripping each of said circuit-breakers in response to excessive rate of rise of current in the associated feeder circuit, and means ensuring tripping of all of said circuit-breakers upon occurrence of a fault notwithstanding the resulting rate of rise of current is excessive in less than all of said feeder circuits due to the impedance of said conductor which comprises switching means operated in response to tripping of a circuit-breaker in a feeder circuit sufficiently close to the fault to suffer excessive rate of rise of current, and an artificial fault circuit completed by said switching means to effect excessive rate of rise of current in another of said feeder circuits to effect tripping of its circuit-breaker in indirect response to occurrence of the original fault.

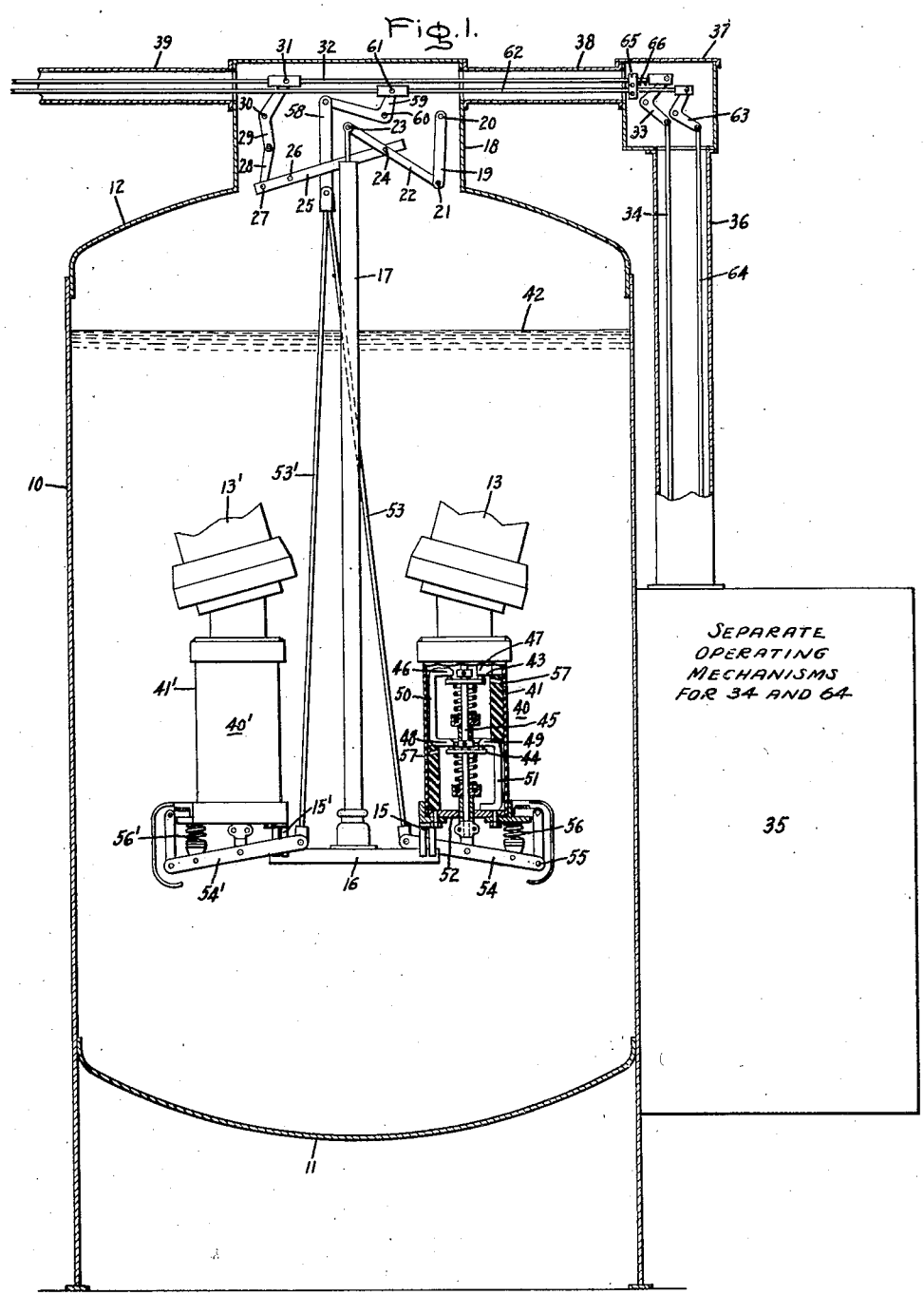

WILLIAM M. SCOTT, Jr.